June 2, 1970
3,514,995
ENGINE TESTING SYSTEM
Filed Feb. 23, 1968
4 Sheets-Sheet 1
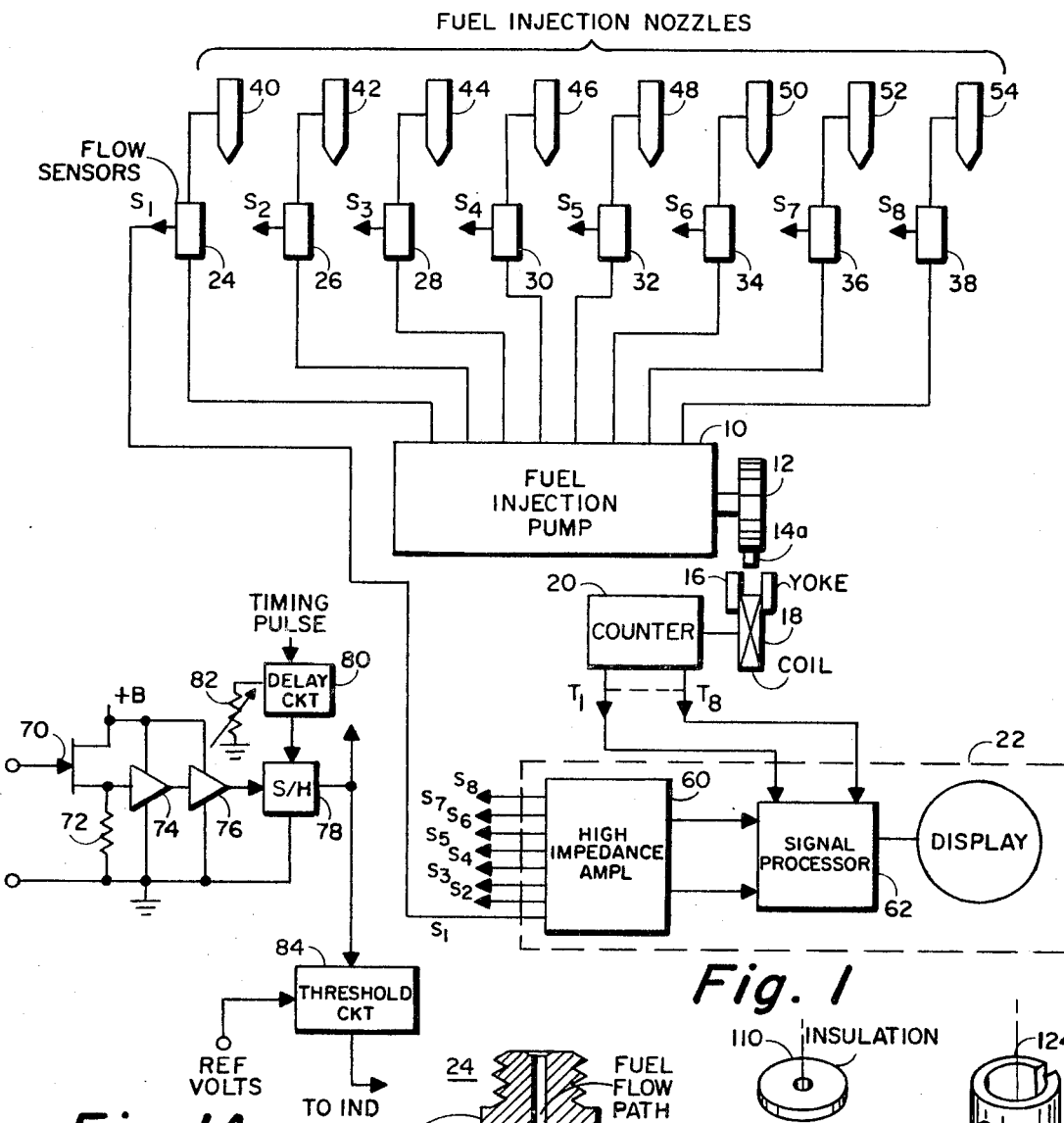
Fig. 1
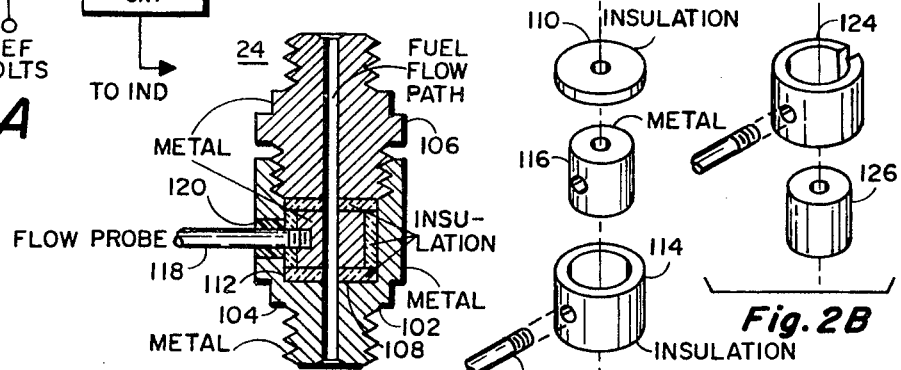
Fig. 1A
Fig. 2
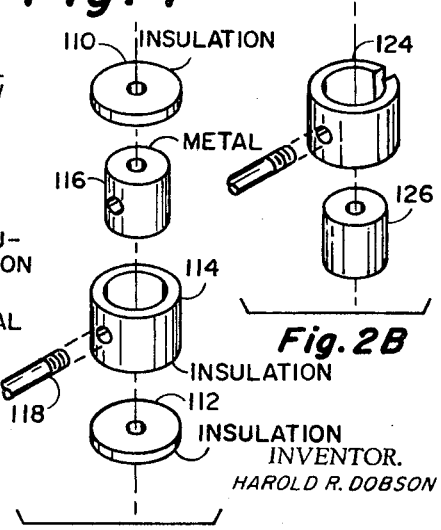
Fig. 2B
Fig. 2A
INVENTOR.
HAROLD R. DOBSON
BY M. Linback ATTY

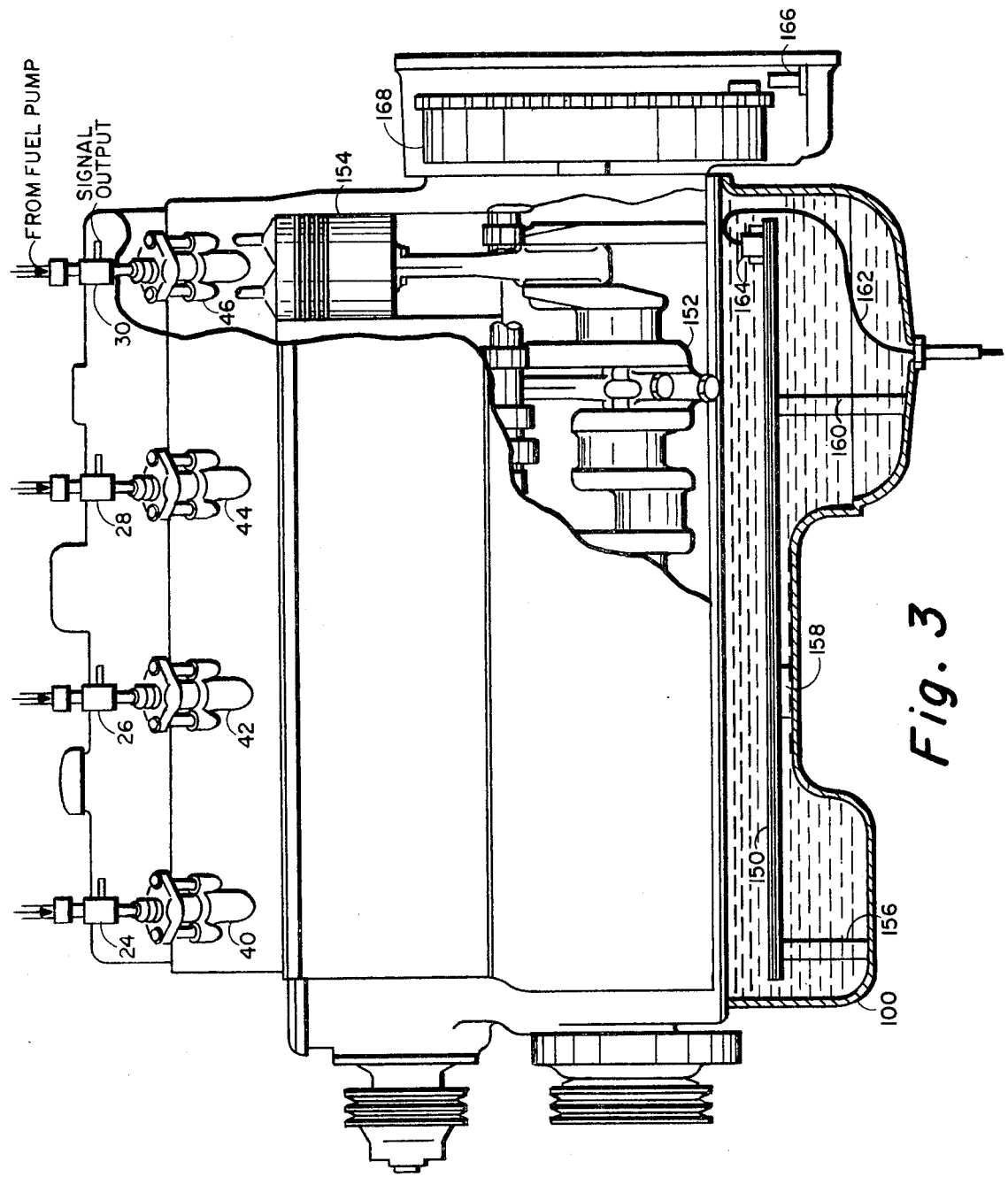

INVENTOR.
HAROLD R. DOBSON

June 2, 1970     H. R. DOBSON     3,514,995
ENGINE TESTING SYSTEM
Filed Feb. 23, 1968     4 Sheets-Sheet 4

INVENTOR.
HAROLD R. DOBSON

BY *M. Lukache* ATTY

United States Patent Office 3,514,995
Patented June 2, 1970

3,514,995
ENGINE TESTING SYSTEM
Harold R. Dobson, Rochester, N.Y., assignor to General Dynamics Corporation, a corporation of Delaware
Filed Feb. 23, 1968, Ser. No. 707,729
Int. Cl. G01m 15/00
U.S. Cl. 73—117.2     15 Claims

ABSTRACT OF THE DISCLOSURE

Systems and devices for testing engines which are described include passive sensor elements which are adapted to detect mechanical motion of engine parts and also the flow of engine fluids, both liquids and gases. The passive sensors can be in the form of probes of conductive material so spaced and shaped so as to be especially sensitive to distortion in the electromagnetic field in the portion of the engine where motion or flow is to be sensed. The system also includes an amplifier for processing the signal from the sensor and display recording or indicating devices which are adapted to show or analyze the condition under test.

The present invention relates to systems and devices for engine testing systems and devices and particularly to systems and devices for providing information as to the condition of various component parts of an engine in accordance with the motion of such parts and/or the flow characteristics of engine fluids, both liquids and gases.

While the invention is especially suitable for use in engine testing systems, it will be appreciated that the invention may also be applied in testing other moving mechanical parts and fluids, both in machines and in industry.

One of the common methods used by a mechanic to determine engine performance is to make a visual and aural observation of the running engine. The smoothness or irregularity of engine vibration is a rough measure of the condition of the ignition and fuel supply systems. In order to test the engine in greater detail, it is usually necessary to disassemble portions of the engine in order to make closer visual inspection, or in order to install special gages for reading pressure, temperature and flow. These gages, as well as the visual and aural inspection methods, provide "signatures" of the engine response. The signature of a normally operating engine has been found to contain mainly the high frequency components of motion of the component parts of the engine. When the engine is not running smoothly, say when one or two cylinders are misfired, low frequency components of motion become dominant. By means of the signature, the mechanic is enabled to make fine adjustments, say in carburation and timing and to assure himself that the engine is performing optimally.

It has been found, in accordance with the invention, that signatures of the motion of engine parts, as well as fluids, such as fuel, entering the cylinders, can be obtained without necessitating disassembly of the engine and without the need for gages which contact the engine parts. The invention therefore provides a system for producing signatures of engine performance which can be used for analysis and fine adjustment of engine operating conditions.

It is an object of the invention to provide improved devices and systems for analyzing the operating condition of engines and their moving parts and fluids.

It is a further object of the present invention to provide improved devices for detecting the motion of movable parts and/or fluids.

It is a still further object of the present invention to provide improved systems and devices for determining the operating condition of engines and of their moving parts and fluids which does not require disassembly of the engine, nor contact with the engine parts.

It is a still further object of the present invention to provide improved devices and systems for engine fault analysis which are relatively simple and are easy to install and use.

Briefly described, an engine testing system embodying the invention includes a sensor which is disposed in the vicinity of the engine part or fluid under test. The sensor may be in the form of a probe of conductive material. It is passive in nature and requires no electrical power and uses no moving mechanical parts in and of itself. An amplifier, together with electrical filters having a bandpass depending upon the frequency or rate of motion of the part or fluid under test, is coupled to the sensor. Signal processing means including, for example, sample and hold circuits, provide outputs which carry information as to the signature of the engine part under test. A display or indicator, such as an electromechanical pen recorder, may be used to graphically display the signature.

The invention itself, both as to its organization and method of operation, as well as additional objects and advantages thereof will become more readily apparent from a reading of the following description in connection with the accompanying drawings in which:

FIG. 1 is a block diagram of an engine testing system embodying the invention;

FIG. 1A is a schematic diagram of portions of the signal processor shown in FIG. 1;

FIG. 2 is a sectional view of the sensor shown in FIG. 1;

FIG. 2A is an exploded view of portions of the sensor shown in FIG. 2;

FIG. 2B is an exploded view similar to FIG. 2A of portions of a sensor in accordance with another embodiment of the invention;

FIG. 3 is a diagrammatic view, partially broken away, and showing a diesel engine incorporating the sensors shown in FIG. 2 and an additional sensor in accordance with still another embodiment of the invention;

Figure 5:
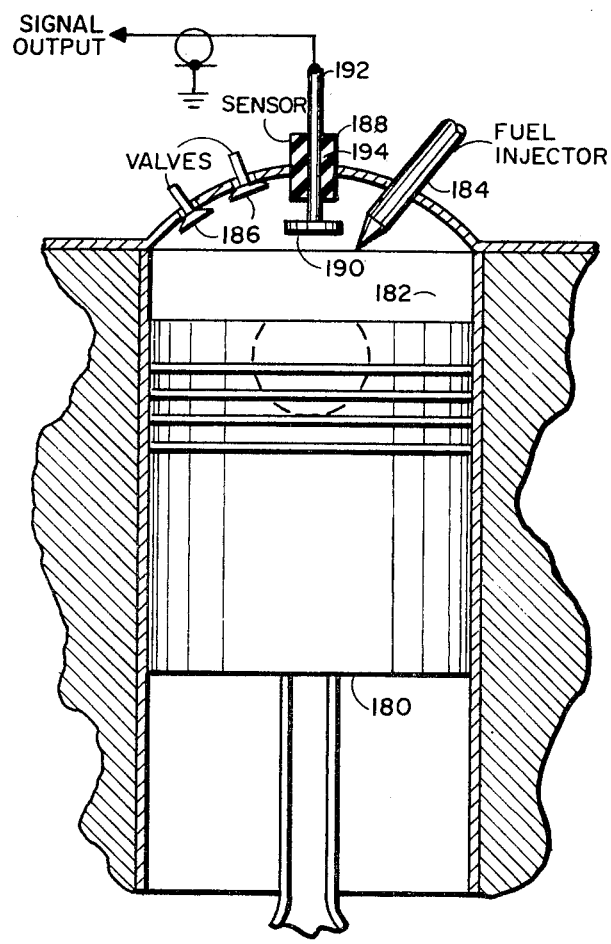
FIG. 5 is a fragmentary sectional view showing a cylinder of a diesel engine embodying a sensor in accordance with the invention for detecting the motion of the piston in the cylinder.

Referring more particularly to FIG. 1, the system provided by the invention is shown applied to indicate the operating condition of the fuel injection system in a diesel engine. The system includes a fuel injection pump 10 having a flywheel 12. A metallic element 14a may protrude from the flywheel 12 so as to enter into the magnetic circuit of a yoke 16. The yoke is U shaped and has a coil 18. When the metallic element 14a passes through the yoke 16, a pulse is generated by the coil 18. This pulse is applied to a counter 20 which may be a string of flip-flops for counting a number of equal to the number of fuel injection nozzles or cylinders which, in this case, is eight. Thus, the counter will output a sequence of timing pulses $T_1$ through $T_8$ which are applied to the electrical fuel injection analyzer 22 which will be described in detail hereinafter.

The fuel lines from the pump 10 pass through flow sensors 24, 26, 28, 30, 32, 34, 36 and 38 and thence into fuel injection nozzles 40, 42, 44, 46, 48, 50, 52 and 54 one for each of the eight cylinders of the engine. The flow sensors are passive electrical sensing devices which will be described in connection with FIGS. 2A and 2B.

Each of these sensors puts out a separate electrical signal $S_1$ through $S_8$ on separate ones of eight lines. These lines are each connected to a separate high input impedance amplifier 60. These amplifiers 60 may have a field effect transistor in their input stage, as will be described in connection with FIG. 1A. Other forms of a high impedance amplifier may, however, be used. An amplifier having a pentode input stage is also suitable. The amplifiers are connected to a signal processor 62 which may include sampling or switching circuits which connect a display device 64, such as an oscillograph. The amplifier outputs may be applied to the display sequentially under the control of the timing pulses $T_1$ through $T_8$. To this end, the signal processor may include a separate one of eight analog gates for each of the amplifier outputs. These gates are enabled sequentially upon occurrence of each of the timing pulses $T_1$ through $T_8$, which are applied to different ones of the gates. Alternatively, if the display is a recorder or an oscillograph having eight separate channels, the amplifier outputs may be applied directly, each to a separate channel of the display.

It may be desirable to provide in the output of each amplifier a filter having a cutoff at approximately the frequency or rate of flow of the fluid. In the instant case, the fuel injection pump will provide pulses of fluid through the flow sensors and into the nozzles. These pulses will occur at approximately ⅛ the speed of rotation of the fuel injection pump. Thus, assuming the fuel injection pump rotation is the engine speed, say 600 r.p.m., filters having a cutoff frequency at approximately 100 cycles per second may be used. Such filters will preclude high frequency noise from distorting the display.

It follows also from the foregoing that the pulses produced by the coil 18 will be at eight times the frequency of the pulses of fluid which flow through the sensors. The delay in the counter stages is also selected such that the eight timing pulses occur coincidentally with the passage of fluid pulses through the sensors. The pulses $T_1$ through $T_8$ therefore strobe the amplifiers and insure that the measurement is made during the time that the fluid passes through the sensors; thus isolating the analyzer from noise and other distortion which occur outside the time interval of interest.

The amplifier shown in FIG. 1A includes a field effect transistor 70. The gate electrode of that transistor is connected to the sensor element. The source electrode is connected to the operating voltage supply indicated at +B. The drain electrode is connected to ground through a resistor 72. As will be discussed in connction with FIG. 2, the sensor includes a probe portion which is connected to the gate electrode and a body portion which is grounded. The body provides a ground or reference plane. This body portion is electrically and mechanically connected to the engine block. Therefore, the drain resistor is also effectively connected to the engine block which serves as a common ground for the amplifier.

The amplifier includes a pair of operational amplifier stages 74 and 76 which are also connected to ground and to +B. The first of these amplifiers 74 receives an input from the drain electrode across the drain resistor 72 and amplifies the sensor output signal. Additional amplification is provided in the second operational amplifier 76. A sample and hold circuit 78 which may form part of the signal processor 62 receives the output of the amplifier 76. This circuit 78 may be a transistor switch connected to a capacitor. The switch is enabled by a timing pulse after it passes through a delay circuit 80 (e.g. such as a one-shot multivibrator). The delay in the circuit 80 may be adjusted by a potentiometer 82. Upon receipts of the timing pulse, say pulses $T_1$ for example, the transistor in the sample and hold circuit is enabled to permit the amplifier 76 output to charge the capacitor. At the end of the timing pulse interval, the voltage across the capacitor in the circuit 78 is a measure of the signal from the sensor. This signal is held until the beginning of next timing pulse, at which time it is modified. The delay circuit 80 is used to adjust the time of application of the timing pulse to the sample and hold circuit, so as to insure that the timing pulse occurs coincidentally with the passage of the fuel pulse through the sensors. The output of the sample and hold circuit may be applied to the display device.

Simultaneously, the output may be applied to a threshold circuit 84, such as a Schmitt trigger, to which a source of reference voltage is also applied. The Schmitt trigger will produce an output level so long as the output of the sample and hold circuit is greater than the reference voltage magnitude. Thus, if fuel is being supplied in the proper time interval to the fuel injection nozzles 40–54, an output voltage from the sample and hold circuit will be sufficient to be above the reference voltage level. Thus, the threshold circuit will provide an output which will indicate that the flow of fuel is proper. Should the flow of fuel fall below the desired rate, the threshold circuit will not be triggered, therefore providing an indication, which may be displayed on a lamp, indicating a malfunction in a particular cylinder. It will be appreciated that a separate threshold circuit and indicator will be provided for each of the eight cylinders.

FIG. 3 which depicts a diesel engine 100 and shows the location of the flow sensors 24–34. Four sensors 30–38, which are not shown, are on the opposite side of the engine from that depicted in FIG. 3.

A typical flow sensor 24 is shown in FIGS. 2 and 2A. The fuel flow path extends axially through the sensor. The sensor itself is a cylindrical structure having a body portion 102 having two sections 104 and 106 which are threaded into each other so as to define a chamber 108. The bottom of the flow sensor has a thread which is screwed into the cylinder cap. A threaded end on the top of the upper section 106 receives a coupling for connecting the fuel line. After flowing through the sensor, the fuel passes into the injection nozzle, as shown in FIG. 1. Within the cavity 108 there are a pair of insulating disks 110 and 112, between which are sandwiched cylindrical sleeve 114 of insulating material. A conductive metal cylinder 116, say of copper, is located within the sleeve 114. A rod of conductive material 118, also desirably of copper, is threaded into the metal cylinder 116 and extends through the insulating sleeve 114 and an insulating grommet 120. The flow of fluid therefore passes through the sensor and along the metallic cylinder 116 where it causes an electrical signal to be picked up. This signal appears at the rod 118. The rod 118 may be connected to the input of the amplifier. The conductive elements in the form of the metal cylinder 116 may be thought of as a probe which senses the flow of the fluid (viz the exact quantity of fluid delivered to the cylinder on each injection stroke) electrically.

While the sensor 24, shown in FIG. 2 has the probe internally in the fuel line, the sensor probe may also be disposed externally of the fuel line. As shown in FIG. 2B, the metal cylinder may instead be a split ring of conductive material 124 within which an insulating ring 126 is inserted. In certain cases where the fuel line is itself of insulating material, say of plastic, the split ring may be disposed around that insulating fuel line.

While the theory of operation of the sensor is not entirely understood, the following discussion of a possible theory is presented with the view of clarifying the invention. The invention is, of course, not to be taken as limited to any theory of operation. Consider that every physical object, such as a moving engine part and even the oil and fuel in the engine, carries charged particles. These particles move with the parts. Thus, the variations in their respective fields is a measure of the operation of the engine (viz engine characteristics). Thus, notwithstanding that the sensor is passive (viz has no external source of energy), it detects a signal corresponding to the movement of the charged particles on the engine parts in its vicinity. The energy which produces the signals arises out of the inherent field and the motion of the engine. Thus, the laws of conservation of energy are not violated. This signal may be analyzed to determine if the engine is operating properly. Because the motion of the engine parts is repetitive, spurious signals which are essentially random can readily be ignored in the analysis. The conductive probe defines in its vicinity, the shape or structure of the electric field. The motion of an object, such for example as a pulse of fluid flowing through the line, perturbs that field and effectively distorts the field pattern. This perturbation may be produced by ionized or conductive particles, such as molecules or electrons in the fluid. The sensor is extremely sensitive to the motion of these particles. Thus, it detects the effect of this motion as an electrical signal. This signal has a waveform which is a signature of the motion and may be used to analyze and determine the nature of the flow.

FIG. 3 shows another embodiment of a motion sensor 150 which is disposed in the crank case at the bottom of the engine 100. The sensor 150 has for its purpose the detection of the motion of the crank shaft 152, as the crank shaft is driven by the pistons 154. The sensor 150 is shown in greater detail in FIG. 4. It is supported on three posts 156, 158 and 160. A connection is made to the sensor through an insulated wire 162 which is connected to the sensor by way of a coupling 164.

In order to provide timing pulses for the processor which utilizes the signals from the sensor 150, a pickup 166 which may be similar to the pickup coil and yoke 16, 18, FIG. 1, is disposed adjacent the fly wheel 168 of the engine 100. A protrusion from the fly wheel induces a pulse into the pickup 166. Timing pulses may be generated from the output pulse from the pickup 166 in a manner similar to that described in FIG. 1.

Figure 4:
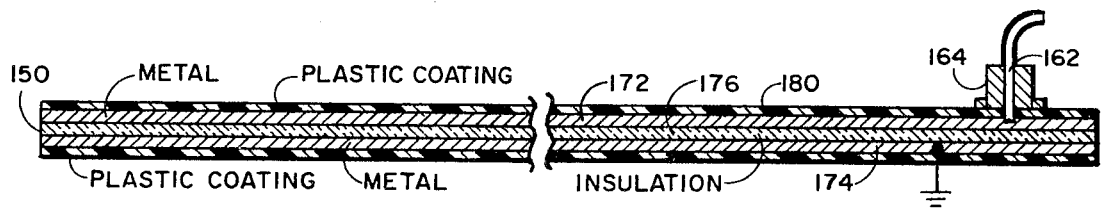
FIG. 4 is a fragmentary sectional view showing the additional sensor depicted in FIG. 3 in greater detail.

The sensor 150, as shown in FIG. 4, includes a pair of metal sheets 172 and 174 separated by a thin insulating sheet 176. The sheet 176 is desirably very thin and may be a layer of mica or an electro-deposited film. If the conductive sheets are aluminum, one side of one sheet may be anodized to provide the insulating layer 176. The conductive sheets are encased by a plastic coating 180 on all sides. The coating on the lower side may be pierced by one of the posts 158 which provides a ground connection, ground being the engine block. The lower conductive metal sheet therefore affords a ground plane which has been found to enhance the sensitivity of the sensor 150. It will be noted that the ground plane is opposite to the ungrounded metal sheet 172 which is closest to the moving part (the crank shaft 158), the motion of which is to be detected. The coupling 164 is merely an insulating member which is fastened as by being cemented to the upper portion of the plastic coating. The wire 162 extends through the coupling 164 and makes contact with the upper metal sheet 172. This wire, of course, is insulated outside of the coupling 164. The wire is connected to the input of the high impedance amplifier.

FIG. 5 shows a system in accordance with the invention for analyzing the movement of a piston 180 in a cylinder 182 of the engine. The fuel injection nozzle 184 is located in the cylinder head. Also located in the cylinder head are the valves 186 which control the exhaust from the cylinder. A motion sensor 188 is provided in the form of a disk of conductive material 190 which is carried on a rod of conductive material 192. The rod extends through an insulating bushing 194 through the cylinder head. A signal output is obtained by a wire which is connected to the rod 192. This signal output may be coupled to the input of a high impedance amplifier and the signature of the motion of the piston displayed as described in connection with FIG. 1. This signature is useful to detect the deterioration in the valves, piston rings, rod bearings, fuel injection nozzles, as well as in the cylinder chamber itself.

Figure 6:
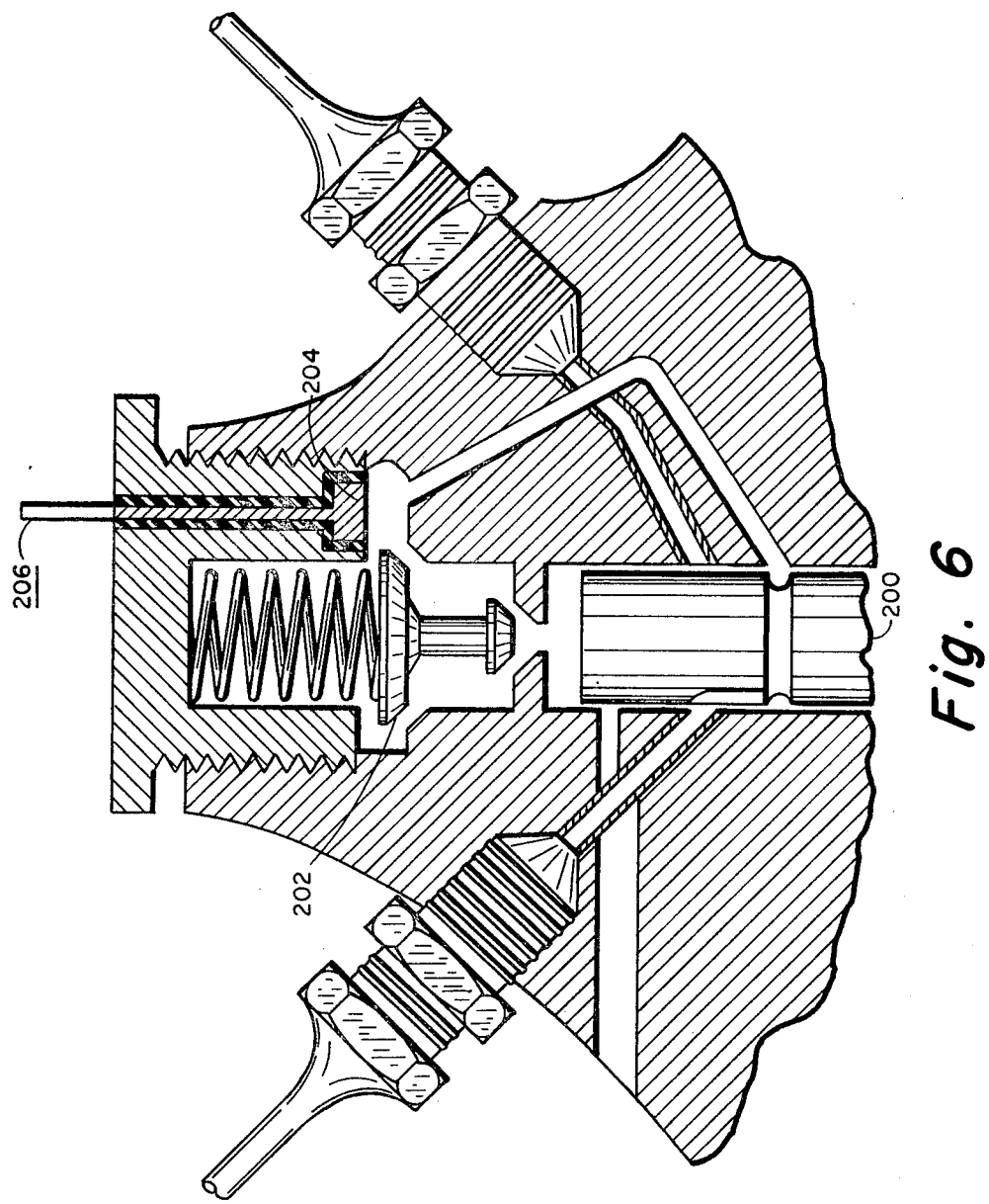
FIG. 6 is a fragmentary sectional view of a single plunger fuel injection pump embodying a sensor in accordance with an embodiment of the invention.

Referring to FIG. 6, there is shown a single plunger fuel injection system. The plunger 200 is rotated and reciprocated by a gear, cam mechanism driven by the engine. Fuel is delivered when the delivery valve 200 is moved upward by the pressure of the fuel created by the plunger 200. As the pulse of fuel created when the valve 200 opens passes the conductive probe portion 204 of the sensor 206, a signal is generated which may be processed as described above.

From the foregoing discussion, it will be apparent that there has been provided an improved system for analyzing engines and determining the condition of moving parts and the flow of fluids such as fuel into the engine. Sensor devices have been described which are especially suitable for use in providing electrical signal outputs which depict the signature of the motion of these engine parts. Modifications and variations is these sensor devices and in the system itself will, of course, adjust themselves to those skilled in the art. Accordingly, the foregoing description should be taken merely as illustrative and not in any limiting sense.

What is claimed is:

1. A sytem for testing an engine having a movable mechanical element and a stationary element which have an inherent electric field in the region therebetween, said system comprising
   (a) a passive probe of conductive material disposed between said elements and coupled to said electric field existent in the entire region between said stationary and movable elements,
   (b) means coupled to said probe providing electrical signals generated in said probe due only to the variation in said field, and
   (c) means responsive to said signals for analyzing the operating condition of said movable element.

2. The invention as set forth in claim 1 wherein said electrical signal providing means includes a network having an active device presenting a very high input impedance at the input thereof, said input being connected to said probe.

3. The invention as set forth in claim 2 wherein said network is an amplifier.

4. The invention as set forth in claim 1 wherein said probe surface is spaced from and adjacent to said movable element.

5. The invention as set forth in claim 4 wherein said spacing is provided by a body of electrical insulating material adjacent to said surface of said probe.

6. A system for testing an engine having movable elements both mechanical and fluid, said system comprising
   (a) a probe of conductive material disposed adjacent to at least one of said elements, and coupled to the electrical field in the entire region between said one element and the surface of said probe which is most closely adjacent thereto,
   (b) means coupled to said probe for providing electrical signals derived by said probe as a function of the variations in said field,
   (c) means responsive to said signals for analyzing the operating condition of said one element,
   (d) said analyzing means including means for providing timing pulses synchronous with the movement of said one element of said engine, and
   (e) signal processing means responsive to said electrical signals and to said timing pulses for processing said signals at predetermined time intervals.

7. The invention as set forth in claim 6 wherein said signal processing means includes a sample and hold circuit, means for applying said timing pulses to said sample and hold circuit, and means for displaying the voltage output of said sample and hold circuit.

8. The invention as set forth in claim 7 including a threshold circuit for indicating when the said voltage is below a predetermined level.

9. A system for testing an engine having movable elements both mechanical and fluid said system comprising
   (a) a probe of conductive material disposed adjacent to at least one of said elements, and coupled to the electrical field in the entire region between said one element and the surface of said probe which is most closely adjacent thereto,
(b) means coupled to said probe for providing electrical signals derived by said probe as a function of the variations in said field,
(c) means responsive to said signals for analyzing the operating condition of said one element,
(d) said engine having a plurality of cylinders,
(e) a plurality of channels each containing a separate probe, associated with each of said cylinders,
(f) a plurality of said signal providing means for each of said cylinders, each coupled to a different one of said probes, and
(g) said analyzing means including means connected to the output of each of said channels for indicating all of said channel outputs.

10. A system for testing the operation of a cylinder in an engine which contains a piston, said system comprising a probe of conductive material having a head, means for positioning said head in insulating relationship within said cylinder with said head of said probe opposite to said piston, and spaced therefrom so as to be coupled to the electrical field produced by said piston and the gas moved thereby, and a high input impedance amplifier connected to said probe for deriving an electrical signal indicative of the operating condition of said cylinder.

11. In combination with an engine having a fuel line, a probe for providing information respecting the flow of fuel which comprises, a cylinder of conductive material having an opening therethrough, a sleeve of insulating material around said cylinder, a pair of disks of insulating material at opposite ends of said cylinder having openings communicating with said cylinder opening, a casing retaining the cylinders and disks in assembled relationship, said casing having openings communicating with said cylinder opening through said disk openings, said casing also providing couplings with said fuel line, and a conductive member extending in through said casing and in insulating relationship therewith into contact with said cylinder.

12. The invention as set forth in claim 11 including a tube of insulating material disposed within said cylinder and between said disks for insulating said fluid from said conductive cylinder.

13. The invention as set forth in claim 12 wherein said cylinder is split by an opening extending the length thereof for breaking an electrical circuit defined circumferentially around said cylinder.

14. A probe system for providing information respecting the motion of an element which has an inherent electric field in the region adjacent thereto, which system comprises a pair of solid plates of conductive material adjacent to said element and coupled to the electric field in the region around said element, a layer of insulating material separating said plates, means for connecting one of said plates to a point of like potential to the potential of said element, means for contacting the other of said pair of plates to provide an output generated by said probe due only to the variation in said field, and means responsive to said output for indicating the operating condition of said element.

15. The invention as set forth in claim 14 including a coating of insulating material encompassing said plates and layer.

References Cited

UNITED STATES PATENTS

| | | |
|---|---|---|
| 2,491,445 | 12/1949 | Cunningham et al. |
| 2,492,493 | 12/1949 | Misson. |
| 3,070,995 | 1/1963 | Broder et al. ____ 73—117.2 X |
| 3,149,492 | 9/1964 | Weinberg. |
| 3,243,997 | 4/1966 | Traver _____ 73—117.2 |
| 3,327,526 | 6/1967 | North. |
| 3,344,663 | 10/1967 | Dreisin et al. |
| 3,375,711 | 4/1968 | Ives et al. _____ 73—117.2 |
| 1,579,168 | 3/1926 | Vawter _____ 317—261 |
| 2,113,376 | 4/1938 | Janco _____ 73—115 |
| 3,190,125 | 6/1965 | Holz _____ 73—116 X |

OTHER REFERENCES

Roberts, H. C.: Mechanical Measurements by Electrical Methods, second edition, Pittsburgh, Pa. (1951), p. 41.

JERRY W. MYRACLE, Primary Examiner

U.S. Cl. X.R.

73—71.4, 119, 194